(12) United States Patent
Williams et al.

(10) Patent No.: US 10,328,907 B2
(45) Date of Patent: Jun. 25, 2019

(54) MODULAR VEHICULAR VACUUM CLEANING SYSTEM

(71) Applicant: Emerson Electric Co., St. Louis, MO (US)

(72) Inventors: Matthew A. Williams, Bridgeton, MO (US); Alex J. Wall, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 30 days.

(21) Appl. No.: 15/473,161

(22) Filed: Mar. 29, 2017

(65) Prior Publication Data

US 2017/0282866 A1    Oct. 5, 2017

Related U.S. Application Data

(60) Provisional application No. 62/315,975, filed on Mar. 31, 2016.

(51) Int. Cl.
| | | |
|---|---|---|
| *B60S 1/64* | (2006.01) | |
| *A47L 5/38* | (2006.01) | |
| *A47L 9/28* | (2006.01) | |
| *A47L 9/14* | (2006.01) | |

(52) U.S. Cl.
CPC . *B60S 1/64* (2013.01); *A47L 5/38* (2013.01); *A47L 9/1409* (2013.01); *A47L 9/2842* (2013.01); *A47L 9/2857* (2013.01); *A47L 9/2884* (2013.01); *A47L 9/2894* (2013.01)

(58) Field of Classification Search
CPC .. B60S 1/64; A47L 5/38; A47L 9/1409; A47L 9/2842; A47L 9/2857; A47L 9/2884; A47L 9/2894
See application file for complete search history.

(56) References Cited

U.S. PATENT DOCUMENTS

| | | | |
|---|---|---|---|
| 5,189,753 A | | 3/1993 | Sousa et al. |
| 5,829,091 A | * | 11/1998 | Ingram ............... A47L 5/38 |
| | | | 15/313 |
| 6,148,472 A | * | 11/2000 | Arena ............... A47L 9/108 |
| | | | 15/313 |
| 6,490,751 B2 | | 12/2002 | Ganzenmuller et al. |
| 6,813,805 B2 | | 11/2004 | Ganzenmuller |
| 7,152,272 B2 | | 12/2006 | Rukavina et al. |
| 7,231,686 B1 | | 6/2007 | Matheney |

(Continued)

FOREIGN PATENT DOCUMENTS

| | | |
|---|---|---|
| CN | 2871268 Y | 2/2007 |
| DE | 19916199 A1 | 10/2000 |

(Continued)

*Primary Examiner* — Dung Van Nguyen
(74) *Attorney, Agent, or Firm* — Armstrong Teasdale LLP

(57) ABSTRACT

A vacuum cleaning system for a vehicle includes a debris collection unit, a fluid conduit connected to an outlet of the debris collection unit, and a vacuum suction unit fluidly connected to the debris collection unit by the fluid conduit. The debris collection unit defines a storage cavity for storing debris collected by the vacuum cleaning system, and is positionable in a first compartment of the vehicle. The vacuum suction unit is located remote from the debris collection unit, and is positionable in a second compartment of the vehicle separate from the first compartment.

22 Claims, 6 Drawing Sheets

(56) References Cited

U.S. PATENT DOCUMENTS

| | | |
|---|---|---|
| 7,266,859 B2 | 9/2007 | Slone |
| 7,480,957 B2 * | 1/2009 | Ganzenmuller, V ..... B60S 1/64 15/313 |
| 7,513,007 B2 | 4/2009 | Chernoff |
| 8,286,300 B2 | 10/2012 | Norell et al. |
| 8,312,590 B2 | 11/2012 | Norell et al. |
| 8,347,452 B2 | 1/2013 | Maehata et al. |
| 8,615,845 B2 | 12/2013 | Norell et al. |
| 9,003,600 B2 | 4/2015 | Norell et al. |
| 9,751,504 B2 * | 9/2017 | Schultz .................... B60S 1/64 |
| 9,937,900 B2 * | 4/2018 | Logli, Jr. ................. B60S 1/64 |
| 2004/0107528 A1 | 6/2004 | LeClear et al. |
| 2004/0154122 A1 * | 8/2004 | Xu ........................... B60S 1/64 15/313 |
| 2006/0080801 A1 | 4/2006 | Nameth |
| 2009/0019662 A1 * | 1/2009 | Yona ....................... B60S 1/64 15/313 |
| 2010/0043168 A1 | 2/2010 | Johnson et al. |
| 2010/0083456 A1 | 4/2010 | Norell et al. |
| 2014/0165353 A1 | 6/2014 | Steiner et al. |
| 2015/0283979 A1 | 10/2015 | Oh et al. |

FOREIGN PATENT DOCUMENTS

| | | |
|---|---|---|
| JP | H08104205 A | 4/1996 |
| JP | H10024808 A | 1/1998 |
| JP | 2005319855 A | 11/2005 |
| JP | 2006212121 A | 8/2006 |

* cited by examiner

MODULAR VEHICULAR VACUUM CLEANING SYSTEM

CROSS-REFERENCE TO RELATED APPLICATIONS

This application claims priority to U.S. Provisional Patent Application Ser. No. 62/315,975, filed on Mar. 31, 2016, the disclosure of which is hereby incorporated by reference in its entirety.

FIELD

The field of the disclosure relates generally to vacuum cleaning systems, and more particularly, to modular vacuum cleaning systems for installation in vehicles.

BACKGROUND

Traditionally, cleaning or vacuuming the interior of a vehicle required the use of exterior household vacuum cleaners and related attachments or, alternatively, the use of fixed vacuum systems typically installed outside of commercial car washes. Such traditional methods have several drawbacks. For example, household vacuum cleaners generally required that the cleaning operation occur near a source of AC electrical power, such as within a garage or near a residence. Additionally, use of household vacuum cleaners requires that the vacuum cleaner be moved around the vehicle to access different compartments within the vehicle. Use of vacuum systems at commercial carwashes present several inconveniences for users, such as having to travel to a separate location to clean the vehicle, and use of coin-operated, time-limited vacuum systems.

More recently, vehicle vacuum cleaning systems have been developed for dedicated use within a vehicle. Such vehicle vacuum cleaning systems are generally mounted or installed within a compartment of the vehicle. While such vehicle vacuum cleaning systems may provide advantages over more traditional methods of cleaning vehicles, improvements are still needed in existing vehicle vacuum cleaning systems. For example, at least some known vehicle vacuum cleaning systems occupy an undesirable amount of space within the vehicle, and/or are located at locations within the vehicle that make operation of the vacuum cleaning system burdensome or inconvenient.

Accordingly, a need exists for improved vehicle vacuum cleaning systems that enable more convenient operation, and that reduce or minimize the amount of interior space occupied by the vehicle vacuum cleaning system.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaning system for a vehicle includes a debris collection unit, a fluid conduit connected to an outlet of the debris collection unit, and a vacuum suction unit fluidly connected to the debris collection unit by the fluid conduit. The debris collection unit defines a storage cavity for storing debris collected by the vacuum cleaning system, and is positionable in a first compartment of the vehicle. The vacuum suction unit is located remote from the debris collection unit, and is positionable in a second compartment of the vehicle separate from the first compartment.

In another aspect, a vehicle includes a plurality of compartments and a vacuum cleaning system. The vacuum cleaning system includes a debris collection unit, a fluid conduit connected to an outlet of the debris collection unit, and a vacuum suction unit fluidly connected to the debris collection unit by the fluid conduit. The debris collection unit defines a storage cavity for storing debris collected by the vacuum cleaning system, and is located in a first compartment of the plurality of compartments. The vacuum suction unit is located remote from the debris collection unit and positioned in a second compartment of the vehicle separate from the first compartment.

In yet another aspect, a vehicle includes a plurality of compartments and a vacuum cleaning system. The vacuum cleaning system includes a debris collection unit, a fluid conduit connected to an outlet of the debris collection unit, and a vacuum suction unit fluidly connected to the debris collection unit by the fluid conduit. The debris collection unit defines a storage cavity for storing debris collected by the vacuum cleaning system. The vacuum suction unit is located remote from the debris collection unit, and the debris collection unit and the vacuum suction unit are located within the same compartment of the plurality of compartments.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
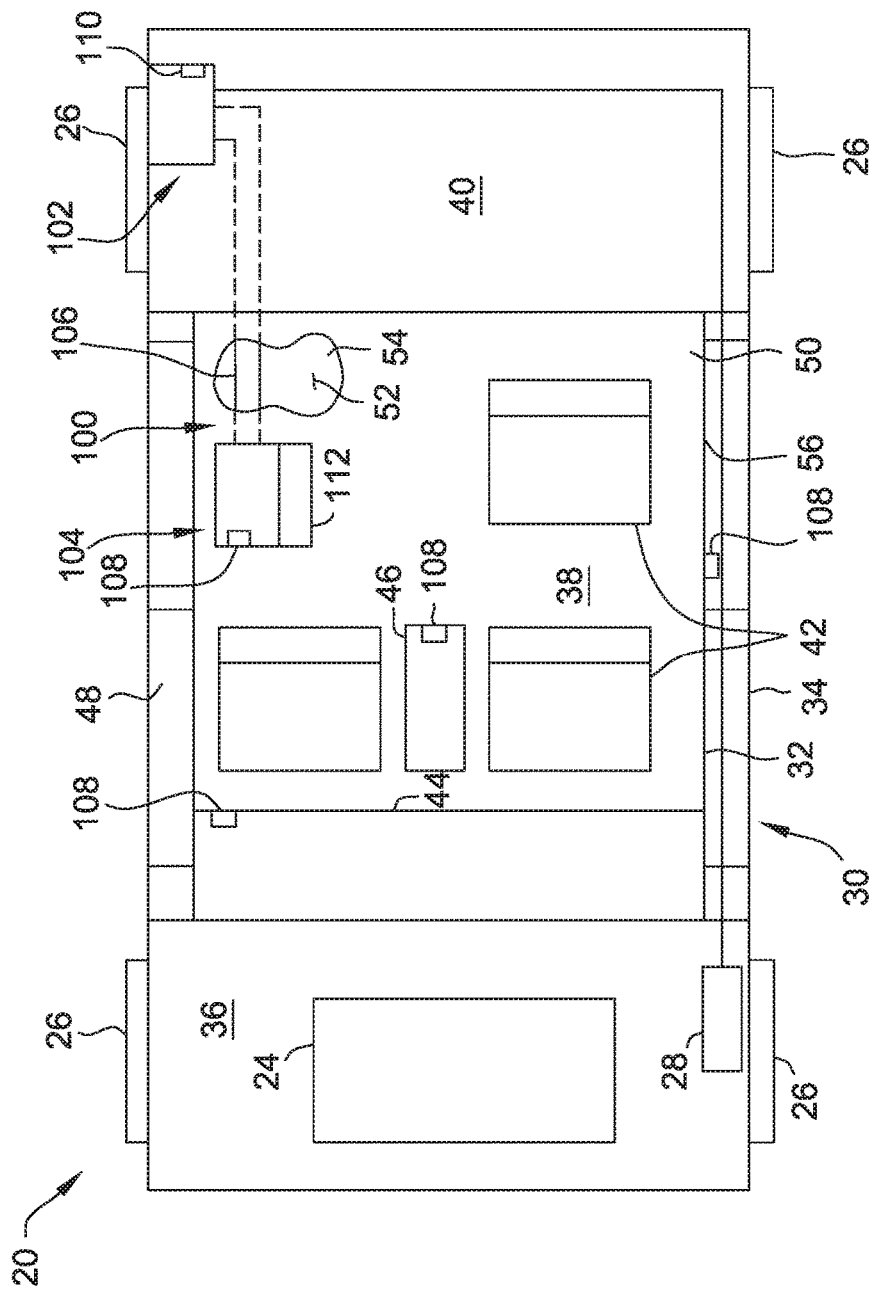
FIG. 1 is a schematic view of a vehicle including an example vehicle vacuum cleaning system.

The present disclosure is generally directed to vehicle vacuum cleaning systems and, more specifically, to modular vehicle vacuum cleaning systems that facilitate more convenient operation as compared to known vehicle vacuum cleaning systems. Additionally, vacuum cleaning systems of the present disclosure facilitate reducing or minimizing the amount of interior space occupied by the vehicle vacuum cleaning system as compared to known vehicle vacuum cleaning systems. For example, embodiments of the vacuum cleaning systems described herein include segmented or modular components that can be located remotely from one another and connected to one another via fluid conduits designed to fit within the space between vehicle panels. In some embodiments, vacuum cleaning systems include a debris collection unit and a separate vacuum suction unit that can be located in a compartment or cavity of the vehicle that is separated or different from the compartment in which the debris collection unit is located. Separating the debris collection unit from the vacuum suction unit enables components of the vacuum cleaning system to be located in compartments or cavities of the vehicle that cannot accommodate single unit vehicle vacuum cleaning systems due to size and/or geometric constraints, thereby enabling better use of space in the vehicle. Moreover, separating the debris collection unit from the vacuum suction unit may facilitate reducing electrical power losses as compared to known vehicle vacuum cleaning systems. For example, separating the debris collection unit from the vacuum suction unit enables the vacuum suction unit, including an electric motor, to be located closer to a power source of the vacuum cleaning system as compared to known vehicle vacuum cleaning systems, thereby reducing electrical power losses associated with electrical line resistance. Additionally, embodiments of the vacuum cleaning systems described herein include multiple suction or vacuum connection ports at which a vacuum tool may be connected to the vacuum cleaning system. Having multiple vacuum connection ports located throughout the vehicle allows the vacuum connection ports to be located closer to debris or other areas of the vehicle to be cleaned with the vacuum cleaning system, and thus enables a shorter length of suction hose to be used to clean an entire vehicle. Because the length of suction hose directly affects air flow resistance and, consequently, the efficiency of debris cleaning, having multiple vacuum connection ports facilitates reducing suction losses associated with longer hose lengths that would otherwise be required to reach all areas of a vehicle, and improving cleaning efficiency.

Additionally, embodiments of the vehicle vacuum cleaning systems include a debris collection unit that includes a removable container that collects debris and other material collected by the vacuum cleaning system. The debris collection unit may be located within a passenger compartment of the vehicle, thereby facilitating access to the debris collection unit and making maintenance operations (e.g., emptying the removable container) more convenient. Moreover, in some embodiments, the debris collection unit includes an interface panel that is accessible from an interior compartment of the vehicle, such as the passenger compartment. In some embodiments, the interface panel enables connection of vacuum tools to the vacuum cleaning system and/or operation (e.g., power control) of the vacuum cleaning system. Thus, embodiments of the vacuum cleaning systems enable more convenient operation of vehicle vacuum cleaning systems by enabling both operation and routine maintenance of the vacuum cleaning system from a single access point within an interior compartment of the vehicle, such as the passenger compartment.

Referring now to the drawings, FIG. 1 is a schematic view of a vehicle 20 including an example modular vacuum cleaning system 100. Vacuum cleaning system 100 is mounted or installed on vehicle 20 to enable vacuum cleaning of vehicle 20 with vacuum cleaning system 100. Vacuum cleaning system 100 may be installed as a stock component on vehicle 20 (e.g., at the time of vehicle production), or as an aftermarket component of vehicle 20.

In the example embodiment, vehicle 20 is an automobile, and generally includes a frame (not shown), a propulsion system 24, a plurality of wheels 26 rotatably connected to the vehicle frame, and a transmission (not shown) connecting propulsion system 24 to one or more of wheels 26. Propulsion system 24 may include any suitable engine or motor that provides power for propelling vehicle 20. Propulsion system 24 may include, for example and without limitation, a gasoline powered engine, an electric motor, and combinations thereof. The transmission is connected to propulsion system 24 such that power from propulsion system 24 is transmitted through the transmission, to a drivetrain (not shown), and to wheels 26 to propel vehicle 20. Examples of automobiles in which vacuum cleaning system 100 may be implemented include, for example and without limitation, cars, trucks, sport utility vehicles, vans, and minivans. In other embodiments, vehicle 20 may be a vehicle other than an automotive vehicle including, for example and without limitation, a recreational vehicle, a watercraft vehicle, or an aircraft vehicle.

Vehicle 20 also includes an energy storage device 28 that stores electric energy and supplies electrical power to one or more components of vehicle. In some embodiments, energy storage device 28 supplies electrical power in the form of a direct current, and acts as a DC power supply. In other embodiments, energy storage device 28 may supply power to components of vehicle 20 in any suitable manner that enables vehicle 20 and vacuum cleaning system 100 to function as described herein. Energy storage device 28 may include, for example and without limitation, a rechargeable battery, such as a lead-acid battery or a lithium ion battery. Energy storage device 28 may be operatively connected to one or more components of vehicle 20, such as an alternator, that generates electrical energy during operation of vehicle 20. In the example embodiment, vacuum cleaning system 100 is electrically connected to energy storage device 28 to receive electrical power therefrom. In other embodiments, vacuum cleaning system 100 may be connected to a power supply other than energy storage device 28.

In the example embodiment, vehicle 20 also includes a plurality of panels 30 connected, directly or indirectly, to the frame of vehicle 20. Panels 30 of vehicle 20 generally include interior panels 32 and exterior or body panels 34. Interior panels 32 are located within an interior of vehicle 20, and exterior panels 34 are located on an exterior of vehicle 20. Vehicle panels 30 may include, for example and without limitation, door panels, floor panels, subfloor panels, roof panels, dashboard panels, trim panels, and console panels.

Panels 30 of vehicle 20 divide and/or separate vehicle 20 into multiple compartments or spaces. In the example embodiment, vehicle panels 30 generally separate vehicle 20 into an engine compartment 36, an interior cabin or passenger compartment 38, and a cargo compartment 40 (e.g., trunk or truck bed).

Engine compartment 36 houses components of propulsion system 24, such as an engine or motor, and other systems and components of vehicle 20, such as an engine lubrication system and an engine cooling system. In the example embodiment, engine compartment 36 also houses energy storage device 28, although energy storage device 28 may be located in vehicle compartments other than engine compartment 36 in other embodiments.

Passenger compartment 38 is generally configured to house passengers or occupants of vehicle 20, and includes a plurality of seats 42 for supporting passengers within the passenger compartment 38. Passenger compartment 38 also includes a dashboard or instrument panel 44 and a center console 46 disposed between two of seats 42.

Cargo compartment 40 is generally configured to house or store cargo transported by vehicle 20. Cargo compartment is a generally open space, free of components of vehicle 20. Cargo compartment 40 may include, for example and without limitation, the trunk of a vehicle, a truck bed, or a storage hatch. In the example embodiment, cargo compartment 40 is located in a rear of vehicle 20, and is separated from passenger compartment 38 by one of vehicle panels 30. In other embodiments, cargo compartment 40 may be separated from passenger compartment 38 by a rear row of seats 42, such as in sport utility vehicles, hatchback vehicles, or minivans.

As shown in FIG. 1, vehicle panels 30 also define, alone or in combination with other panels 30, interpanel cavities or compartments 48 within vehicle 20 through which electrical and fluid conduits may be routed. A portion of a floor panel 50 of vehicle 20 is cutaway in FIG. 1, showing a floor panel compartment or cavity 52 and a subfloor panel 54.

Vehicle 20 may also include a roof (not shown) that encloses passenger compartment 38. The roof may include a plurality of roof panels, including interior and exterior roof panels.

Vacuum cleaning system 100 generally includes a vacuum suction unit 102, a debris collection unit 104, and at least one fluid conduit 106 fluidly connecting debris collection unit 104 to vacuum suction unit 102. Vacuum suction unit 102 is configured to generate a negative pressure or suction within the vacuum line (i.e., throughout fluid conduit 106 and within debris collection unit 104), which is transferred to a vacuum cleaner tool, such as a vacuum hose or wand, connected to debris collection unit 104. The vacuum cleaner tool may be manually manipulated by a user of the vacuum cleaning system 100 such that dust and other debris is entrained within the air flow generated by vacuum cleaning system 100. Dust and debris entrained within the air flow is collected within debris collection unit 104.

As shown in FIG. 1, vacuum cleaning system 100 may also include one or more vacuum connection ports 108 that enable a vacuum cleaner tool, such as a vacuum hose or wand, to be fluidly connected to vacuum suction unit 102. Vacuum connection ports 108 may be located at various locations throughout vehicle 20, and may be connected to vacuum suction unit 102, through debris collection unit 104, via suitable fluid conduits. That is, vacuum connection ports 108 are fluidly connected to vacuum suction unit 102 such that debris collection unit 104 is positioned within the path of air flow and upstream from vacuum suction unit 102 relative to the direction of air flow. In the example embodiment, vacuum cleaning system 100 includes vacuum connection ports 108 within instrument panel 44, center console 46, a door panel 56, and debris collection unit 104.

Figure 2:
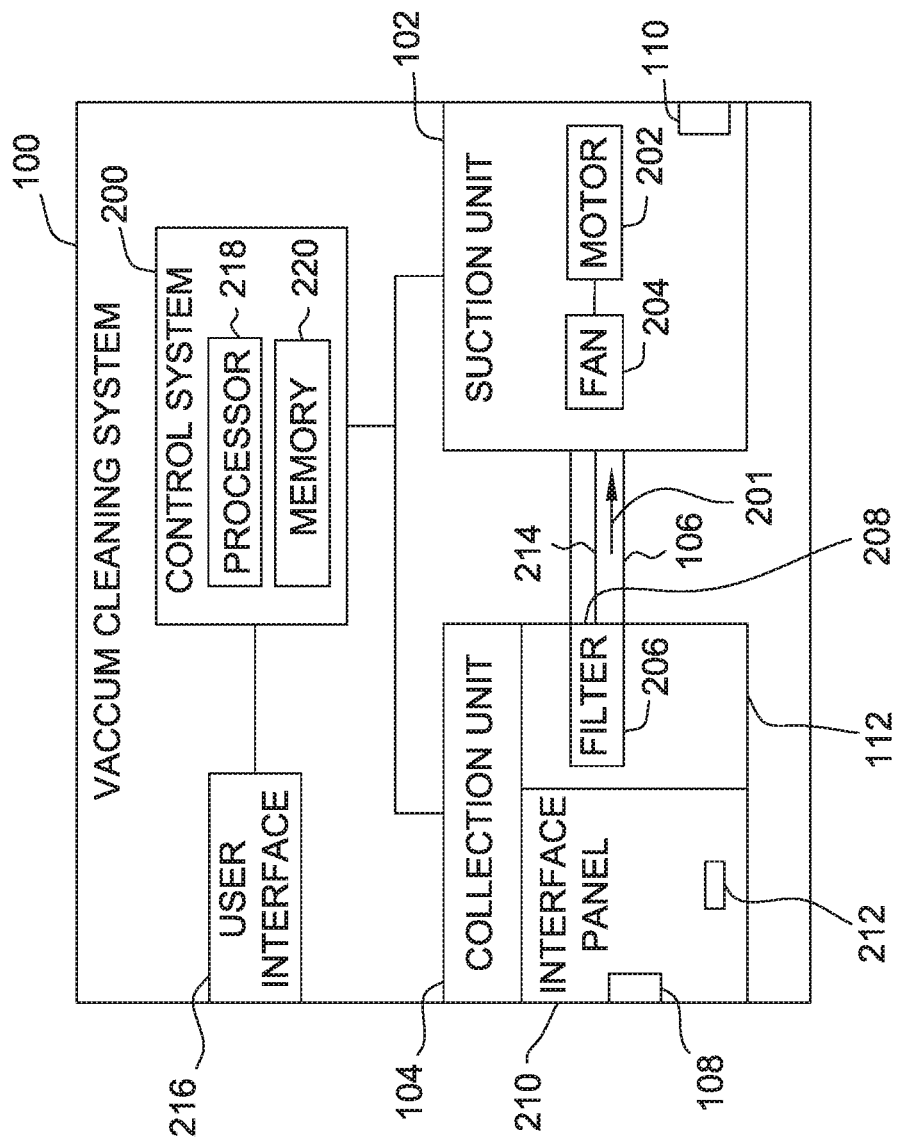
FIG. 2 is a block diagram of the vacuum cleaning system of FIG. 1.

Vacuum cleaning system 100 may also include a controller or control system 200, shown in FIG. 2, for controlling various operations of vacuum cleaning system 100, as described in more detail herein.

Vacuum cleaning system 100 is modular in that components of vacuum cleaning system 100 are manufactured as discrete or segmented units and are connected to one another by suitable fluid and/or electrical conduits to form vacuum cleaning system 100. In the illustrated embodiment, for example, vacuum suction unit 102 and debris collection unit 104 are separate from one another. That is, vacuum suction unit 102 and debris collection unit 104 are manufactured as separate units, and can be positioned or located remotely from one another within vehicle 20. Fluid conduit 106 fluidly connects debris collection unit 104 to vacuum suction unit 102 such that suction or negative pressure generated by vacuum suction unit 102 induces air flow through debris collection unit 104, through fluid conduit 106, and through vacuum suction unit 102.

The modular design of vacuum cleaning system 100 enables components of vacuum cleaning system 100 to be positioned or installed within compartments and cavities of vehicle 20 that cannot accommodate traditional, non-modular vacuum cleaning systems due to size and geometric constraints. For example, vacuum suction unit 102 and debris collection unit 104 can be positioned or installed in numerous different areas of vehicle 20 that traditional, non-modular vacuum cleaning systems could not be installed.

In the example embodiment, vacuum suction unit 102 is located in the cargo compartment 40 of vehicle 20, and debris collection unit 104 is located in passenger compartment 38. More specifically, debris collection unit 104 is recessed within floor panel 50. Fluid conduit 106 is routed through floor panel cavity 52 from vacuum suction unit 102 to debris collection unit 104. As noted above, in other embodiments, vacuum suction unit 102, debris collection unit 104, and fluid conduit 106 may be located within any suitable area of vehicle 20 that enables vacuum cleaning system 100 to function as described herein. In some embodiments, for example, vacuum suction unit 102 and/or debris collection unit 104 may be located within engine compartment 36, passenger compartment 38, instrument panel 44, center console 46, a seatback of one of seats 42, flooring of vehicle 20, subflooring of vehicle 20, roof panels, and any of the interpanel compartments 48 defined by vehicle panels 30. In yet other embodiments, one or more components of vacuum cleaning system 100, such as debris collection unit 104, may be located on the exterior of vehicle 20, such as within one of exterior panels 34 or within an exterior cargo compartment, such as a truck bed. Further, in some embodiments, fluid conduit 106 may be routed between a floor panel and/or a heat shield of vehicle 20 and vehicle carpeting. Moreover, fluid conduit 106 may have a cross-section or suitable profile to match the contour or profile of the vehicle carpeting, thereby reducing rises or other visual signs of fluid conduit 106. In some embodiments, for example, a top or upper wall of fluid conduit 106 may be substantially conformal with a floor panel and/or a layer of vehicle carpeting.

As noted above, vacuum suction unit 102 and debris collection unit 104 are located in separate compartments of vehicle 20 (i.e., cargo compartment 40 and passenger compartment 38, respectively). In other embodiments, vacuum suction unit 102 and debris collection unit 104 may be located remote from one another, yet within the same compartment of vehicle 20, and connected to one another via fluid conduit 106. In some embodiments, for example, vacuum suction unit 102 and debris collection unit 104 may be located in passenger compartment 38, yet spaced apart from one another and fluidly connected via fluid conduit 106.

With additional reference to FIG. 2, vacuum suction unit 102 generally includes operating components of vacuum cleaning system 100, including, for example and without limitation, a motor 202 and a vacuum impeller or fan 204 operatively connected to motor 202. Motor 202 may generally comprise any suitable motor known in the art, such as any electric motor typically utilized in vacuum cleaning systems. Similarly, fan 204 may generally comprise any suitable known fan or vacuum impeller, such as any vacuum impeller typically utilized in vacuum cleaning systems. Vacuum suction unit 102 may further include any other suitable component or device that enables vacuum suction unit 102 to operate as described herein. For example, vacuum suction unit 102 may further include a vacuum inlet connected to fluid conduit 106 and a vacuum outlet 110 to allow air flow through the vacuum suction unit 102 during operation. For example, air may pass through a vacuum cleaner tool, such as a vacuum hose (not shown), attached to debris collection unit 104, into and through vacuum suction unit 102, and out of outlet 110. It will be understood by those of skill in the art that a vacuum cleaner tool, such as a vacuum hose or wand, may optionally be attached to outlet 110 of vacuum suction unit 102 for use as a blower, if desired.

In the example embodiment, vacuum suction unit 102 is electrically connected to energy storage device 28 of vehicle 20 to receive electrical power therefrom. In other embodiments, vacuum suction unit 102 may be connected to a power supply other than energy storage device 28. In some embodiments, for example, vacuum suction unit 102 may include an auxiliary power connection configured for connection to an AC power supply, such as standard 120V wall outlet. Control system 200 of vacuum cleaning system 100 may control or regulate the electrical power supplied to vacuum suction unit 102 from energy storage device 28 or other power supply.

Debris collection unit 104 is generally configured to collect and retain dust and other debris or foreign substances entrained within the air flow generated by vacuum suction unit 102 during operation. Debris collection unit 104 has a debris storage cavity defined therein that stores dust and other debris collected by vacuum cleaning system 100 during operation. In some embodiments, the debris storage cavity may be defined within a debris container 112 that is removably connected to debris collection unit 104 such that debris container 112 can be removed from debris collection unit 104 to discard dust and other debris collected by vacuum cleaning system 100 during operation. In such embodiments, debris container 112 may have any suitable construction that enables vacuum cleaning system 100 to function as described herein. For example, debris container 112 may be constructed of, for example and without limitation, rigid plastics and have a relatively rigid construction. As another example, debris container 112 may be constructed of, for example and without limitation, flexible filter media and have a relatively flexible construction. In other embodiments, debris collection unit 104 may itself by removably connected to vehicle 20 such that debris collection unit 104 can be removed from vehicle 20 to discard dust and other debris collected within the debris storage cavity during operation.

As shown in FIG. 2, debris collection unit 104 may also include a filter 206. In the embodiment illustrated in FIG. 2, filter 206 is sealingly connected around an outlet 208 of debris collection unit 104 such that all air flow through debris collection unit 104 flows through filter 206. Filter 206 may generally comprise any suitable known filtering component or filter media known in the art, such as any filtering component or filter media typically utilized in vacuum cleaning systems. As shown in FIG. 2, filter 206 is positioned upstream of fluid conduit 106 and vacuum suction unit 102 relative to the direction of air flow, indicated by arrow 201. Consequently, air flow through fluid conduit 106 and vacuum suction unit 102 is relatively clean and free of debris as compared to air flow through debris collection unit 104.

Figure 4:
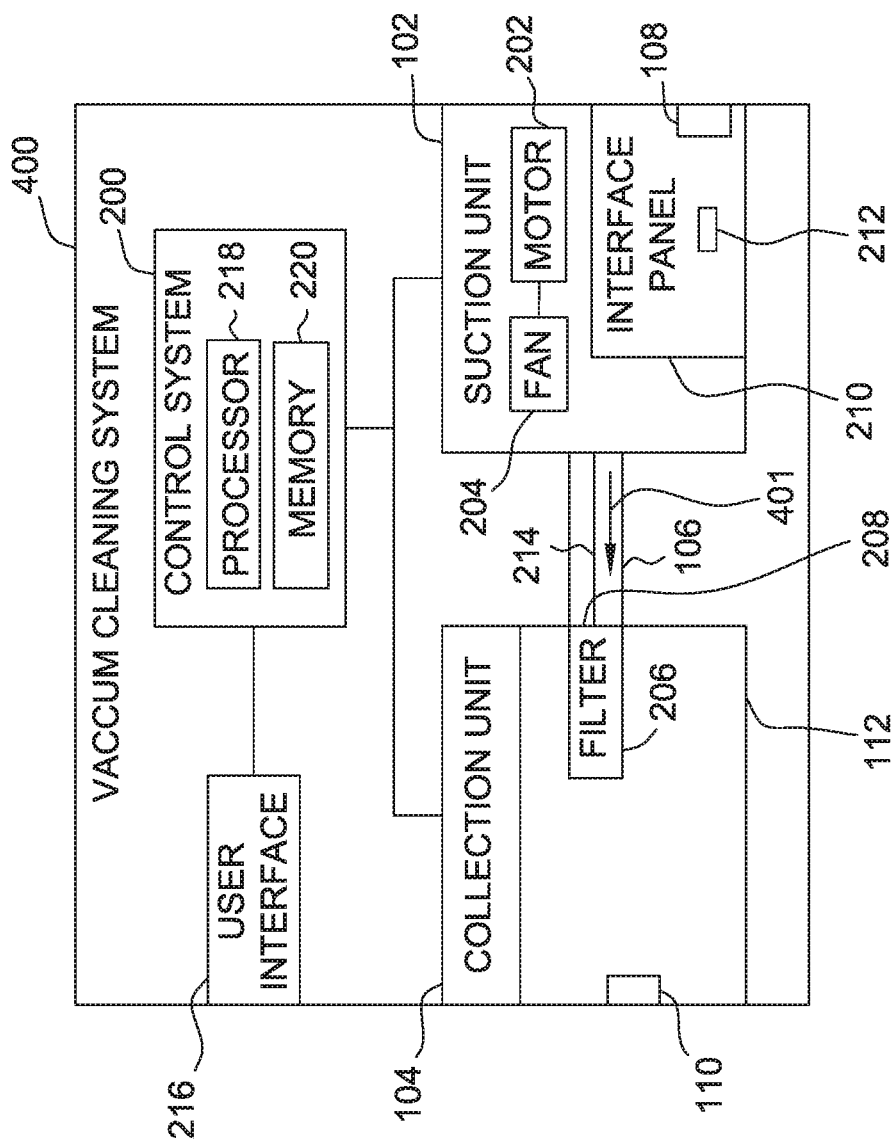
FIG. 4 is a block diagram of the vacuum cleaning system of FIG. 1 with a filter positioned downstream from a vacuum suction unit of the vacuum cleaning system.

In other embodiments, filter 206 may be positioned downstream from fluid conduit 106 relative to the direction of air flow. In some embodiments, for example, filter 206 may be positioned downstream from motor 202 and fan 204 relative to the direction of air flow. FIG. 4, for example, is a block diagram of an example vacuum cleaning system 400 in which filter 206 is positioned downstream from motor 202 and fan 204 relative to the direction of air flow, indicated by arrow 401. In this embodiment, the direction of air flow 401 is reversed relative to the direction of air flow in the embodiment of FIG. 2. As such, outlet 208 of debris collection unit 104 functions as an inlet to debris collection unit 104. Additionally, debris collection unit 104 includes outlet 110, and suction unit 102 includes a vacuum connection port 108 that defines an air inlet to suction unit 102. In this embodiment, air flow through fluid conduit 106 and vacuum suction unit 102 would be unfiltered or "dirty".

Referring again to FIG. 2, vacuum cleaning system 100 also includes an interface panel 210 accessible from an interior compartment of vehicle 20. In some embodiments, interface panel 210 enables convenient operation of vacuum cleaning system 100 by enabling vacuum cleaning system 100 to be turned on and off and otherwise controlled from within an interior compartment of vehicle 20, without having to access the vacuum suction unit 102. For example, interface panel 210 generally allows a user to connect vacuum cleaner tools to vacuum cleaning system 100. In some embodiments, for example, interface panel 210 includes vacuum connection port 108 configured for connection to a vacuum cleaner tool, such as a vacuum hose or vacuum wand. Vacuum connection port 108 may have any suitable configuration to allow vacuum cleaner tools to be releasably secured to vacuum connection port 108. For example, vacuum connection port 108 may include threads configured to engage threads of a vacuum cleaner tool, or slots or tabs that form a bayonet-type connection with a vacuum cleaner tool. In other embodiments, vacuum connection port 108 may be sized and shaped to form a press-fit connection with a vacuum cleaner tool.

In this embodiment, debris collection unit 104 includes interface panel 210, and vacuum connection port 108 defines an air inlet of debris collection unit 104 that allows air flow into the debris storage cavity defined by debris collection unit 104 or debris container 112. Thus, in operation, air flows through the vacuum cleaner tool connected to vacuum connection port 108, through the air inlet defined by vacuum connection port 108, into the debris storage cavity defined within debris collection unit 104, through filter 206, and out of outlet 208. Air then flows through fluid conduit 106 and through vacuum suction unit 102. In other embodiments, interface panel 210 may be associated with components of vacuum cleaning system 100 other than debris collection unit 104, such as suction unit 102, as shown in FIG. 4.

In some embodiments, interface panel 210 also enables users to control operation of vacuum cleaning system 100. For example, in some embodiments, interface panel 210 includes a power or activation switch 212 that controls the supply of power to vacuum suction unit 102. Interface panel 210 may be communicatively connected to other components of vacuum cleaning system 100, such as vacuum suction unit 102 and control system 200, via electrical conduits 214. In some embodiments, electrical conduits 214 may be routed through (i.e., disposed within) the fluid flow path defined by fluid conduit 106. In other embodiments, electrical conduits 214 are routed outside of the fluid flow path defined by fluid conduit 106.

In yet other embodiments, interface panel 210 is operable to wirelessly communicate with other components of vacuum cleaning system 100, such as vacuum suction unit 102 and control system 200. In some embodiments, for example, interface panel 210 includes a wireless transmitter, and suction unit 102 includes a wireless receiver for wirelessly receiving activation and deactivation signals transmitted by the wireless transmitter of interface panel 210. In such embodiments, interface panel 210 may wirelessly transmit activation and deactivation signals to vacuum suction unit 102 to control operation of vacuum cleaning system 100.

In some embodiments, vacuum cleaning system 100 may also include a user interface 216 configured to output (e.g., display) and/or receive information (e.g., from a user) associated with vacuum cleaning system 100. In some embodiments, user interface 216 is configured to receive an activation and/or deactivation inputs from a user to activate and deactivate (i.e., turn on and off) vacuum suction unit 102 and enable operation of vacuum cleaning system 100. Moreover, in some embodiments, user interface 216 is configured to output information associated with one or more operational characteristics of vacuum cleaning system 100, including, for example and without limitation, the remaining capacity of debris collection unit 104, the remaining capacity or lifetime of filter 206, warning indicators (e.g., when debris collection unit 104 has reached its maximum capacity or when filter 206 should be replaced), a status of vacuum suction unit 102 (e.g., on or off), and a charge level associated with energy storage device 28.

User interface 216 may include any suitable input devices and output devices that enable user interface 216 to function as described herein. For example, user interface 216 may include input devices including, but not limited to, a keyboard, mouse, touchscreen, joystick(s), throttle(s), buttons, switches, and/or other input devices. Moreover, user interface 216 may include output devices including, for example and without limitation, a display (e.g., a liquid crystal display (LCD), or an organic light emitting diode (OLED) display), speakers, indicator lights, instruments, and/or other output devices.

In some embodiments, user interface 216 and/or components thereof are incorporated into interface panel 210. In other embodiments, such as the embodiment shown in FIG. 2, user interface 216 may be separate from interface panel 210. In such embodiments, user interface 216 may be located at any suitable portion within vehicle 20 that facilitates convenient access to and control of vacuum cleaning system 100. For example, user interface 216 may be located within instrument panel 44, center console 46, seatback of one of seats 42, or one of door panels 56. Moreover, in some embodiments, user interface 216 may be incorporated or embodied within existing components of vehicle 20, such as an existing information or infotainment system of vehicle 20.

In some embodiments, components of user interface 216 may be incorporated into a vacuum cleaning tool, such as a vacuum hose or wand, to enable activation and control of vacuum cleaning system 100 from the vacuum cleaning tool. In some embodiments, for example, a vacuum cleaning tool includes an input device, such as a button or switch, to enable activation of vacuum cleaning system 100. Further, in some embodiments, a vacuum cleaning tool may include an output device, such as a display or indicator lights, to communicate information associated with vacuum cleaning system 100 to a user at the vacuum cleaning tool.

In yet other embodiments, vacuum cleaning system 100 may be controlled by a remote control interface. In some embodiments, for example, vacuum cleaning system 100 includes a communication interface configured for connection to a wireless control interface that enables remote control and activation of vacuum cleaning system 100. The wireless control interface may be embodied on a portable computing device, such as a tablet or smartphone.

Control system 200 is generally configured to control operation of vacuum cleaning system 100. In some embodiments, for example, control system 200 receives user input from user interface 216 and/or interface panel 210, and controls one or more components of vacuum cleaning system 100 in response to such user inputs. In some embodiments, for example, control system 200 controls power supply to vacuum suction unit 102 based on user input received from user interface 216 and/or interface panel 210. Moreover, in some embodiments, control system 200 may regulate or control electrical power supplied to vacuum cleaning system 100, such as from energy storage device 28. For example, control system 200 of vacuum cleaning system 100 may include one or more power converters or regulators configured to control or regulate the electrical power supplied to components vacuum cleaning system 100, such as motor 202 of vacuum suction unit 102. In some embodiments, for example, control system 200 may include one or more DC power converters or regulators configured to control or regulate DC power supplied by energy storage device 28. Such power converters and regulators may be incorporated or integrated within components of vacuum cleaning system 100, such as vacuum suction unit 102 and/or within motor 202.

Control system 200 may generally include any suitable computer and/or other processing unit, including any suitable combination of computers, processing units and/or the like that may be operated independently or in connection within one another. Control system 200 may include one or more processor(s) 218 and associated memory device(s) 220 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) 220 of control system 200 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 220 may generally be configured to store suitable computer-readable instructions that, when implemented by the processor(s), configure or cause control system 200 to perform various functions described herein including, but not limited to, controlling vacuum cleaning system 100, controlling operation of vacuum suction unit 102, receiving inputs from user interface 216, providing output to an operator via user interface 216, and/or various other suitable computer-implemented functions.

Control system 200 and/or components of control system 200 may be integrated or incorporated within other components of vacuum cleaning system 100. In some embodiments, for example, control system 200 may be incorporated within vacuum suction unit 102. In other embodiments, control system 200 may be incorporated or embodied within existing control systems of vehicle 20.

Figure 3:
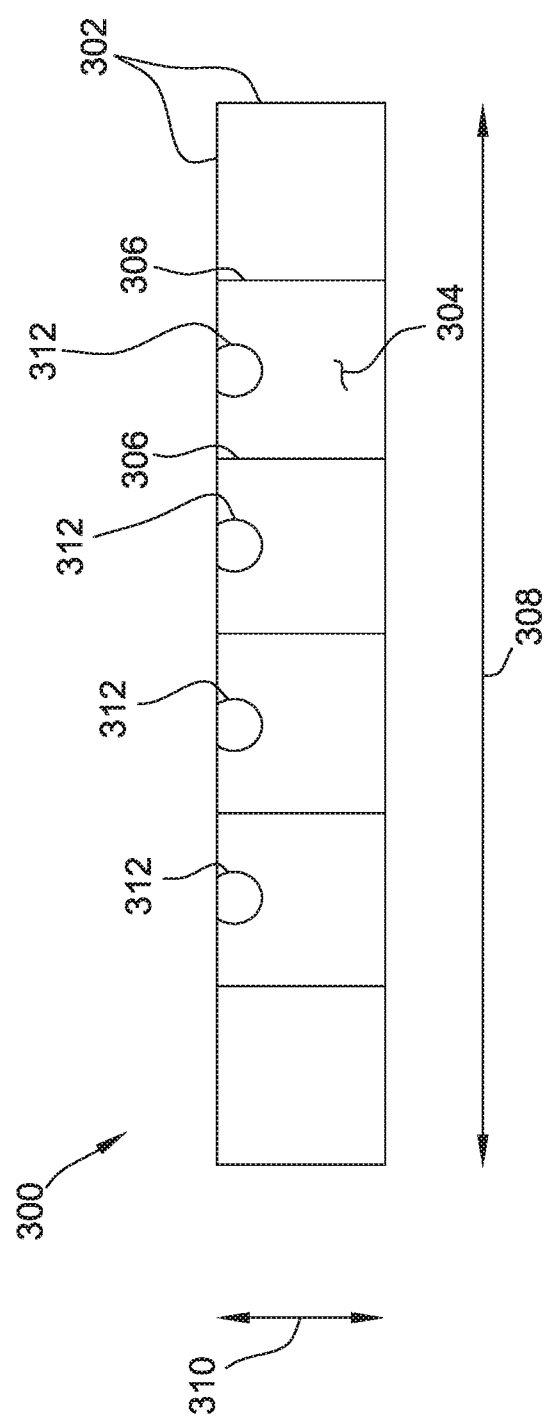
FIG. 3 is a cross-section of an example fluid conduit suitable for use in the vacuum cleaning system of FIG. 1.

FIG. 3 is a schematic cross-section of an example fluid conduit 300 suitable for use with vacuum cleaning system 100. Fluid conduit 300 generally includes sidewalls 302 defining an air flow passage 304 through which air flows during operation of vacuum cleaning system 100. In some embodiments, air flow passage 304 may be segmented or divided into a plurality of smaller air flow passages using baffles 306. In the illustrated embodiment, for example, fluid conduit 300 includes 5 baffles 306 dividing air flow passage 304 into 6 identically sized and shaped air flow passages. In other embodiments, fluid conduit 300 may include more than or less than 5 baffles. In yet other embodiments, fluid conduit 300 may not include any baffles 306 (i.e., be free of baffles), and air flow passage 304 may not be segmented or divided.

In some embodiments, fluid conduit 300 is constructed of a relatively rigid material as compared to flexible fluid conduits, such as tubes or hoses, utilized in some vacuum cleaning systems. In some embodiments, for example, fluid conduit 300 is constructed of hard plastics, such as blow-molded polyethylene or polypropylene. In other embodiments, fluid conduit 300 may be constructed of any suitable material that enables vacuum cleaning system 100 to function as described herein.

In the example embodiment, fluid conduit 300 has a generally rectangular cross-section. In other embodiments, fluid conduit 300 may have a cross-section other than rectangular, including, for example and without limitation, elliptical. In yet other embodiments, fluid conduit 300 may have any suitable cross-section that enables vacuum cleaning system 100 to function as described herein. Moreover, fluid conduit 300 has a low-aspect ratio or "flat" profile that is particularly sized and shaped to fit within interpanel compartments 48 of vehicle 20, such as within cavities or spaces defined by floor panels or door panels of vehicle 20. In some embodiments, for example, fluid conduit 300 has a width or major dimension 308 that is between about 1 to 20 times greater than a height or minor dimension 310 of fluid conduit 300. That is, in some embodiments, fluid conduit 300 has an aspect ratio of between about 1:1 and about 20:1. In some embodiments, the aspect ratio of fluid conduit 300 is greater than 2:1, greater than 3:1, greater than 4:1, or even greater than 5:1. In yet other embodiments, fluid conduit 300 may have any suitable dimensions that enable vacuum cleaning system 100 to function as described herein.

Moreover, in the example embodiment, fluid conduit 300 includes a plurality of electrical conduits 312 disposed within air flow passage 304. Electrical conduits 312 may be used to electrically connect components of vacuum cleaning system 100 that are fluidly connected to one another by fluid conduit 300 including, for example and without limitation, debris collection unit 104 and vacuum suction unit 102. In some embodiments, for example, an input device and/or an output device on debris collection unit 104 (e.g., on interface panel 210) is electrically connected to vacuum suction unit 102 via one or more of electrical conduits 312.

In some embodiments, electrical conduits 312 disposed within air flow passage 304 include only low gauge electrical conduits used, for example and without limitation, for low voltage or communication signals. In other embodiments, electrical conduits 312 disposed within air flow passage 304 may include any size gauge of electrical conduit including, for example and without limitation, electrical conduit sized for power transfer.

Figure 5:
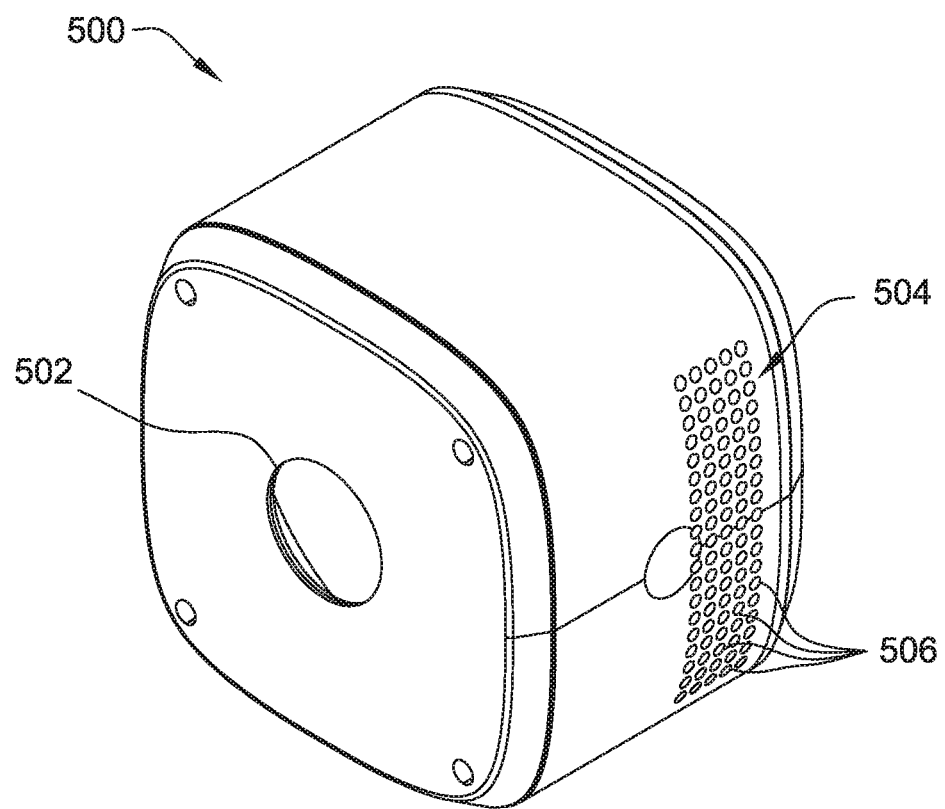
FIG. 5 is a perspective view of an example vacuum suction unit housing suitable for use with the vacuum cleaning system shown in FIG. 1.
Figure 6:
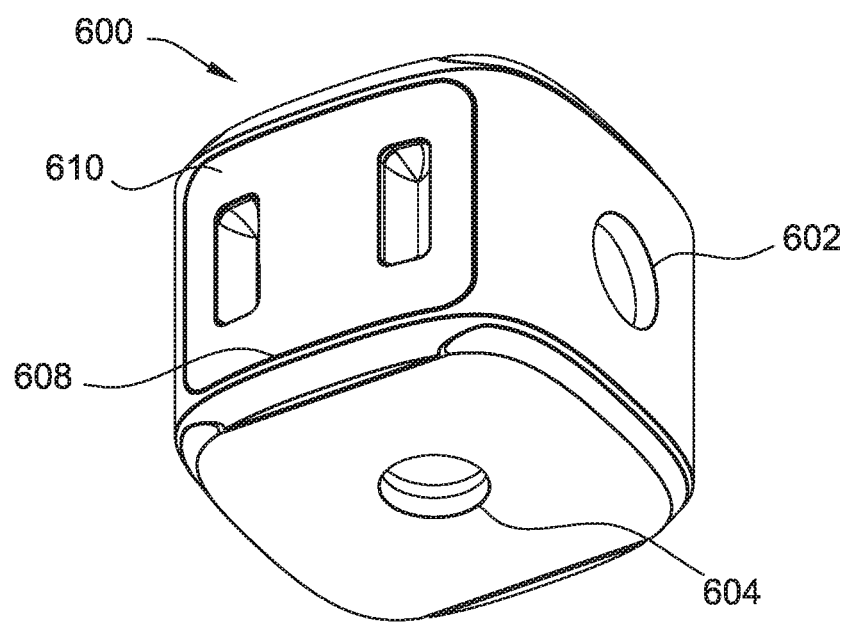
FIG. 6 is a bottom perspective view of an example debris container suitable for use with the vacuum cleaning system shown in FIG. 1.

FIG. 5 is a perspective view of an example vacuum suction unit housing 500 suitable for use with vacuum cleaning system 100, and FIG. 6 is a bottom perspective view of an example debris container 600 suitable for use with vacuum cleaning system 100. Vacuum suction unit housing 500 houses motor 202 and fan 204 (shown in FIG. 2), and defines an inlet 502 and an outlet 504. In this embodiment, inlet 502 has a circular cross-section, and outlet 504 is defined by a plurality of circular-shaped outlet holes 506. In other embodiments, inlet 502 may have any other suitably shaped cross-section that enables vacuum cleaning system 100 to function as described herein including, for example and without limitation, rectangular, elliptical, and polygonal. In some embodiments, inlet 502 has a cross-section sized and shaped complementary to a cross section of fluid conduit 106. In this embodiment, vacuum suction unit housing 500 has a cuboid shape with rounded or chamfered edges. In other embodiments, vacuum suction unit housing 500 may have any other suitable shape that enables vacuum cleaning system 100 to function as described herein.

As shown in FIG. 6, debris container 600 includes an inlet 602 and an outlet 604. In this embodiment, debris container 600 has a cuboid shape with rounded or chamfered edges. In other embodiments, debris container 600 may have any other suitable shape that enables vacuum cleaning system 100 to function as described herein.

In use, debris container outlet 604 is fluidly connected to inlet 502 of vacuum suction unit housing 500 by a suitable fluid conduit, such as fluid conduit 106 or fluid conduit 300. Debris container inlet 602 is connected, directly or indirectly, to a vacuum cleaner tool, such as a vacuum hose or wand. In some embodiments, debris container inlet 602 is a vacuum connection port 108 (shown in FIG. 1), and is connected directly to a vacuum cleaner tool. Air flow generated by motor 202 and fan 204 (shown in FIG. 2) flows through the vacuum cleaning tool, into debris container 600 via debris container inlet 602, out of debris container 600 via debris container outlet 604, through the fluid conduit that connects debris container 600 to vacuum suction unit housing 500, into vacuum unit suction housing 500 via inlet 502, and out of vacuum suction unit housing 500 via outlet 504.

Figure 7:
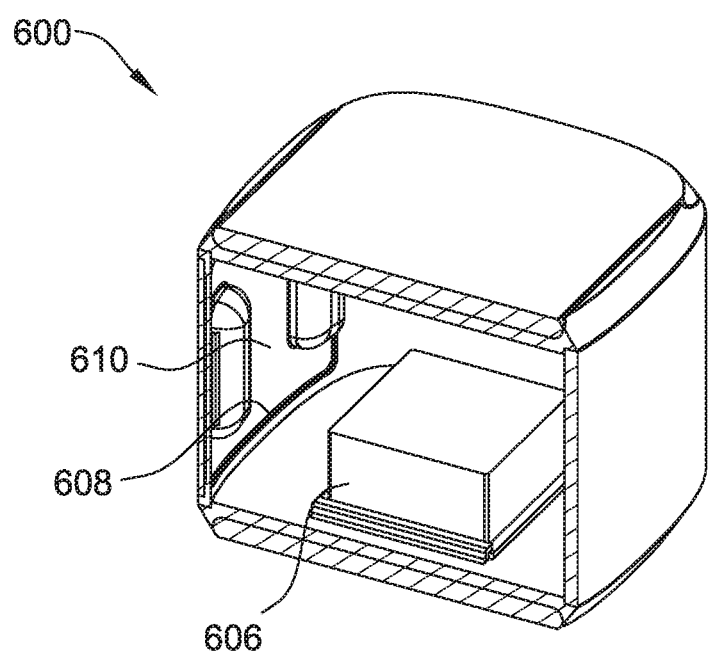
FIG. 7 is a sectional view of the debris container shown in FIG. 6.

FIG. 7 is a sectional view of debris container 600. As shown in FIG. 7, debris container 600 includes a filter 606 that covers outlet 604 to filter air flow through debris container 600. Debris container 600 also includes an access opening 608 and an access panel 610 that is removably connected to debris container 600 and covers access opening 608 when connected to debris container 600. Filter 606 may be accessed, for example, to clean or replace filter, by removing access panel 610 and accessing filter 606 through access opening 608.

Vacuum suction unit housing 500 and debris container 600 may be located in any suitable vehicle compartments that enables vacuum cleaning system 100 to function as described herein. In some embodiments, for example, one of vacuum suction unit housing 500 and debris container 600 is located in passenger compartment 38 of vehicle 20, and the other of vacuum suction unit housing 500 and debris container 600 is located in a different compartment of vehicle 20, such as engine compartment 36, cargo compartment 40 (e.g., a trunk or a truck bed), a floor panel compartment, and a door panel compartment. In yet other embodiments, vacuum suction unit housing 500 and debris container 600 are located in the same compartment of vehicle 20.

As noted above, vacuum cleaning system 100 facilitates reducing or minimizing the amount of interior space occupied by the vehicle vacuum cleaning system as compared to known vehicle vacuum cleaning systems. For example, as described herein, the modular design of vacuum cleaning system enables components of vacuum cleaning system 100 to be installed in different compartments of vehicle 20. One example method of installing vacuum cleaning system 100 generally includes positioning debris collection unit 104 in a first compartment of vehicle 20, positioning vacuum suction unit 102 in a second compartment of vehicle separate from first compartment such that vacuum suction unit 102 is located remote from debris collection unit 104, and fluidly connecting debris collection unit 104 to vacuum suction unit 102 via fluid conduit 106.

In operation, vacuum cleaning system 100 is used to clean vehicle 20. Specifically, a vacuum cleaner tool, such as a vacuum hose or wand, is connected to one of vacuum connection ports 108, and vacuum cleaning system 100 is activated to generate suction or air flow through the vacuum cleaner tool. Vacuum cleaning system 100 may be activated from within an interior compartment of vehicle 20, such as passenger compartment 38, using activation switch 212 on interface panel 210 or other suitable input device of user interface 216. Control system 200 receives or detects the activation signal, and enables the supply of power to vacuum suction unit 102 (e.g., motor 202) from energy storage device 28 to turn motor 202 on. Control system 200 may control or regulate the power supplied to vacuum suction unit 102 from energy storage device 28 using suitable power converters or regulators, such as a DC power converter or regulator. Rotation of motor 202 causes fan 204 to rotate, which induces air flow throughout vacuum cleaning system 100. Air flows first through the vacuum cleaner tool connected to vacuum connection port 108, through the debris collection unit 104, through fluid conduit 106, through vacuum suction unit 102, and is expelled through outlet 110 of vacuum suction unit 102. Dust and other debris entrained within the air flow are collected within the debris storage cavity defined by debris collection unit 104 or debris container 112. Moreover, filter 206 inhibits or prevents finer particles entrained within the air flow from flowing downstream from debris collection unit 104, such as through fluid conduit 300 or vacuum suction unit 102.

Embodiments of the systems described herein provide several advantages as compared to prior art systems. For example, embodiments of the vacuum cleaning systems described herein facilitate more convenient operation and facilitate reducing or minimizing the amount of interior space occupied by the vehicle vacuum cleaning system as compared to known vehicle vacuum cleaning systems. In some embodiments, for example, vacuum cleaning systems include segmented or modular components that can be located remotely from one another and connected to one another via fluid conduits designed to fit within the space between vehicle panels. For example, embodiments of vacuum cleaning systems described herein include a debris collection unit and a separate vacuum suction unit that can be located in a compartment or cavity of the vehicle that is separated or different from the compartment in which the debris collection unit is located. Separating the debris collection unit from the vacuum suction unit enables components of the vacuum cleaning system to be located in compartments or cavities of the vehicle that cannot accommodate single unit vehicle vacuum cleaning systems due to size and/or geometric constraints, thereby enabling better utilization of unused space of the vehicle. Moreover, separating the debris collection unit from the vacuum suction unit facilitates noise attenuation of the vacuum cleaning system because the vacuum suction unit can be located outside of the passenger compartment, or in portions of the vehicle that include noise shielding or otherwise provide sound insulation from the passenger compartment. Additionally, separating the debris collection unit from the vacuum suction unit may facilitate reducing electrical power losses as compared to known vehicle vacuum cleaning systems. For example, separating the debris collection unit from the vacuum suction unit enables the vacuum suction unit, including an electric motor, to be located closer to a power source of the vacuum cleaning system as compared to known vehicle vacuum cleaning systems, thereby reducing electrical power losses associated with electrical line resistance. Additionally, embodiments of the vacuum cleaning systems described herein include multiple suction or vacuum connection ports at which a vacuum tool may be connected to the vacuum cleaning system. As a result, the vacuum connection ports may be located closer to debris or other areas of the vehicle to be cleaned with the vacuum cleaning system, thereby facilitating a reduction in suction loss associated with a length of vacuum suction hose.

Additionally, embodiments of the vehicle vacuum cleaning systems include a debris collection unit that includes a removable container that collects debris and other material collected by the vacuum cleaning system. The debris collection unit may be located within a passenger compartment of the vehicle, thereby facilitating access to the debris collection unit and making maintenance operations (e.g., emptying the removable container) more convenient. Moreover, in some embodiments, the debris collection unit includes an interface panel accessible from an interior compartment of the vehicle, such as the passenger compartment. In some embodiments, the interface panel enables connection of vacuum tools to the vacuum cleaning system and/or operation (e.g., power control) of the vacuum cleaning system. Thus, embodiments of the vacuum cleaning systems enable more convenient operation of vehicle vacuum cleaning systems by enabling both operation and routine maintenance of the vacuum cleaning system from a single access point within an interior compartment of the vehicle, such as the passenger compartment.

Example embodiments of vacuum cleaning systems are described above in detail. The vacuum cleaning systems are not limited to the specific embodiments described herein, but rather, components of the vacuum cleaning systems may be used independently and separately from other components described herein. For example, the vacuum cleaning systems described herein may be used in vehicles other than automotive vehicles, including without limitation watercraft vehicles and aircraft vehicles.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vacuum cleaning system for a vehicle, the vacuum cleaning system comprising:
a debris collection unit defining a storage cavity for storing debris collected by the vacuum cleaning system, the debris collection unit positionable in a first compartment of the vehicle;
a fluid conduit connected to an outlet of the debris collection unit; and
a vacuum suction unit fluidly connected to the debris collection unit by the fluid conduit, wherein the vacuum suction unit includes an electric motor and a fan operatively connected to the electric motor for generating suction within the fluid conduit and the debris collection unit, the vacuum suction unit located remote from the debris collection unit and positionable in a second compartment of the vehicle separate from the first compartment.

2. The vacuum cleaning system of claim 1 further comprising a filter fluidly connected downstream from the fluid conduit, the motor, and the fan.

3. The vacuum cleaning system of claim 1 further comprising a filter fluidly connected between the debris collection unit and the vacuum suction unit and positioned upstream from the fluid conduit.

4. The vacuum cleaning system of claim 1, wherein the debris collection unit includes an inlet configured for connection to a vacuum cleaner tool, and an outlet connected to the fluid conduit.

5. The vacuum cleaning system of claim 1, wherein the debris collection unit includes an interface panel, the interface panel including a vacuum connection port configured for connection to a vacuum cleaner tool.

6. The vacuum cleaning system of claim 1, wherein the debris collection unit includes an interface panel including at least one of an input device and an output device, the at least one input device and output device electrically connected to the vacuum suction unit via an electrical conduit disposed within an air flow passage defined by the fluid conduit.

7. The vacuum cleaning system of claim 6, wherein the at least one input device and output device includes an activation switch for controlling power supply to the vacuum suction unit.

8. The vacuum cleaning system of claim 6, wherein the fluid conduit has one of an elliptical and a rectangular cross-section with an aspect ratio of between 2:1 and 20:1.

9. The vacuum cleaning system of claim 1, wherein the debris collection unit includes an interface panel including an activation switch configured to activate the vacuum suction unit, and wherein the interface panel is operable to wirelessly transmit activation and deactivation signals to the vacuum suction unit.

10. The vacuum cleaning system of claim 1, wherein the debris collection unit includes a debris container removably connected to the debris collection unit, the debris container defining the storage cavity.

11. The vacuum cleaning system of claim 1, wherein an electrical conduit is disposed within an air flow passage defined by the fluid conduit.

12. A vehicle comprising:
a plurality of compartments;
an energy storage device; and
a vacuum cleaning system including:
a debris collection unit defining a storage cavity for storing debris collected by the vacuum cleaning system, the debris collection unit located in a first compartment of the plurality of compartments;
a fluid conduit connected to an outlet of the debris collection unit; and
a vacuum suction unit fluidly connected to the debris collection unit by the fluid conduit and electrically connected to the energy storage device, the vacuum suction unit located remote from the debris collection unit and positioned in a second compartment of the vehicle separate from the first compartment.

13. The vehicle of claim 12, wherein the debris collection unit is located within a passenger compartment of the vehicle.

14. The vehicle of claim 13, wherein the vacuum suction unit is located within one of a cargo compartment of the vehicle, a trunk of the vehicle, and a truck bed of the vehicle.

15. The vehicle of claim 12, wherein the debris collection unit is located within one of a door panel compartment of the vehicle and a floor panel compartment of the vehicle.

16. A vehicle comprising:
a plurality of compartments; and
a vacuum cleaning system including:
a debris collection unit defining a storage cavity for storing debris collected by the vacuum cleaning system;
a fluid conduit connected to an outlet of the debris collection unit; and
a vacuum suction unit fluidly connected to the debris collection unit by the fluid conduit, the vacuum suction unit located remote from the debris collection unit, wherein the debris collection unit and the vacuum suction unit are located within the same compartment of the plurality of compartments, and wherein the fluid conduit extends through an inter-panel cavity of the vehicle, separate from the compartment in which the debris collection unit and the vacuum suction unit are located, to fluidly connect the debris collection unit to the vacuum suction unit.

17. The vehicle of claim 16 further comprising an energy storage device, wherein the vacuum suction unit is electrically connected to the energy storage device.

18. The vehicle of claim 16, wherein the debris collection unit and the vacuum suction unit are located within a passenger compartment of the vehicle.

19. The vehicle of claim 16, wherein the debris collection unit and the vacuum suction unit are located within a cargo compartment of the vehicle.

20. The vehicle of claim 19, wherein the debris collection unit and the vacuum suction unit are located within one of a trunk of the vehicle and a truck bed of the vehicle.

21. The vehicle of claim 16, wherein the debris collection unit and the vacuum suction unit are located within one of a door panel compartment of the vehicle and a floor panel compartment of the vehicle.

22. The vehicle of claim 16, wherein an electrical conduit is disposed within an air flow passage defined by the fluid conduit.

* * * * *